United States Patent
Bauer

(10) Patent No.: US 7,983,808 B2
(45) Date of Patent: Jul. 19, 2011

(54) FULLY AUTOMATIC STRADDLE CARRIER WITH LOCAL RADIO DETECTION AND LASER STEERING

(75) Inventor: Reinhard Bauer, Remlingen (DE)

(73) Assignee: Noell Mobile Systems GmbH, Wuerzburg (DE)

( * ) Notice: Subject to any disclaimer, the term of this patent is extended or adjusted under 35 U.S.C. 154(b) by 302 days.

(21) Appl. No.: 12/378,744

(22) Filed: Feb. 19, 2009

(65) Prior Publication Data

US 2009/0222159 A1 Sep. 3, 2009

(30) Foreign Application Priority Data

Feb. 28, 2008 (DE) .......................... 10 2008 011 539

(51) Int. Cl.
*G01C 22/00* (2006.01)
(52) U.S. Cl. ........................................................ 701/23
(58) Field of Classification Search .................... 701/23, 701/36, 202, 205, 223; 414/373, 389, 467
See application file for complete search history.

(56) References Cited

U.S. PATENT DOCUMENTS

| D526,932 S | 8/2006 | Bock et al. | |
|---|---|---|---|
| 7,753,637 B2 * | 7/2010 | Benedict et al. | 414/140.3 |
| 2008/0191937 A1 * | 8/2008 | Wisherd et al. | 342/357.03 |

FOREIGN PATENT DOCUMENTS

DE 103 36 084 3/2005

OTHER PUBLICATIONS

"Kalmar launches Autoshuttle," WorldCargo News (Jan. 31, 2008) http://www.worldcargonews.com/htm/w20080131.534586.htm. (Spec, p. 3).
Durrant-Whyte, Hugh et al, "An Autonomous Straddle Carrier for Movement of Shipping Containers," IEEE Robotics & Automation Magazine, Sep. 2007, pp. 14-23. (Spec, p. 3).

* cited by examiner

*Primary Examiner* — Kim T Nguyen
(74) *Attorney, Agent, or Firm* — Collard & Roe, P.C.

(57) ABSTRACT

A fully automatic driverless straddle carrier for transporting and stacking freight containers is equipped with several different sensor systems for the vehicle detection and navigation. Laser scanners are arranged at the vehicle for automatically guiding the vehicle over a container stack. In this straddle carrier, one of the absolute sensor systems for the vehicle detection is made up of a local radio detection system, which is arranged on the vehicle as a mobile radio base station, a plurality of radio transponders being stationarily positioned in the traveling area of the working site, an automatic switching device being provided for switching the steering from the automatic steering by navigation to an automatic steering by laser scanners and vice versa, when the vehicle reaches, travels over or leaves a container stack.

8 Claims, 5 Drawing Sheets

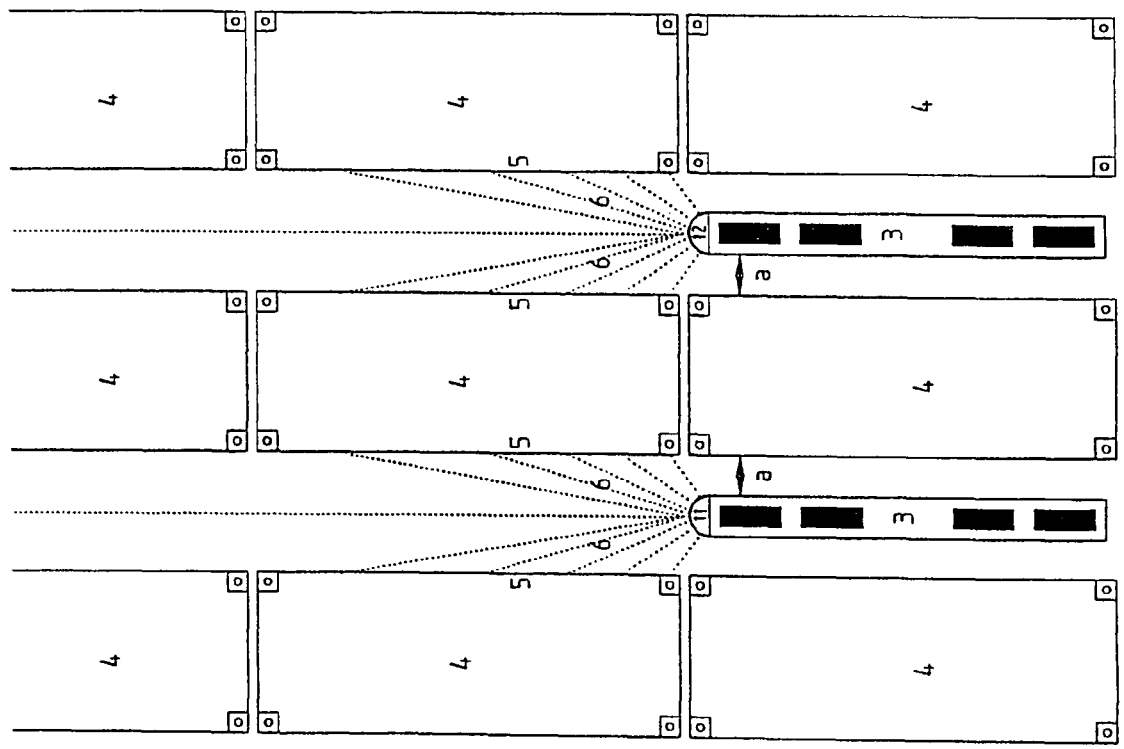

FULLY AUTOMATIC STRADDLE CARRIER WITH LOCAL RADIO DETECTION AND LASER STEERING

CROSS REFERENCE TO RELATED APPLICATIONS

Applicant claims priority under 35 U.S.C. §119 of German Application No. 10 2008 011 539.8 filed Feb. 28, 2008.

BACKGROUND OF THE INVENTION

1. Field of the Invention

The present invention relates to a fully automatic driverless straddle carrier for transporting and stacking freight containers. More particularly, the invention relates to a straddle carrier which is equipped which several different sensor systems for vehicle detection and navigation, the signals of which being evaluated and monitored in an electronic sensor fusion system and the current coordinates of the location determined thereby then being transmitted to a system of electronic controls for automatically steering, driving and positioning the vehicle on present paths stored in an electronic path control, laser scanners being arranged at the vehicle for automatically guiding the vehicle over a container stack.

2. The Prior Art

Straddle carriers are used all over the world in seaports and container terminals for transporting and stacking containers. As shown in U.S. Design Pat. No. D 526,932 S, they consist of two traveling gears with wheels running to the left and to right of the container stack, and of vertical supports placed thereon forming together with the machine scaffold positioned thereon a portal. This portal travels over the containers and lifts them via its lifting gear or puts them down. The straddle carriers have a diesel-electric or a diesel-hydraulic drive and in most cases an electrohydraulic steering mechanism. After presetting the deflection of the steering wheel by the driver, a steering computer controls the hydraulic proportional valves which in turn cause the deflection of the wheels via hydraulic cylinders. Also driverless fully automatic straddle carriers are known. They use in most cases the commonly known processes used for the navigation of all autonomous driverless industrial trucks, in particular individual systems or combinations of absolute and relative navigation sensors.

The following absolute navigation systems are known:
satellite navigation (differential global positioning system (GPS, DGPS))
radar navigation (with a radar device having a rotating antenna on the roof of the vehicle and stationary passive reflectors in the surroundings)
transponder navigation (with transponders or magnets buried in the ground).

The following relative navigation systems are known:
inertial navigation (gyroscopes, inertial measuring units (IMU))
dead reckoning navigation with odometry (distance measuring by rotary encoders at the wheels) and probably additional measuring of the steering angle via a further sensor at the steering mechanism.

For a fully automatic steering, driving and positioning, these known navigation systems must allow the detection of the vehicle position very reliably and with an accuracy of one centimeter. The navigation is therefore very complex and the requirements are fulfilled only by a combination of different redundant diversity, absolute and relative navigation processes.

In "Kalmar launches Autoshuttle" WorldCargo News (Jan. 31, 2008) a solution for fully automatic straddle carriers has been described. The system works with transponder navigation according to the FROG technology, Free Ranging On Grid, in which antennas or magnetic-field sensors are placed at the bottom of the vehicle, which detect transponders or magnets buried in the roadway and recalibrate the odometry in this manner.

"An Autonomous Straddle Carrier for Movement of Shipping Containers", IEEE Robotics & Automation Magazine of September 2007, uses a combination of DGPS (satellite based global positioning system), rotating dwarf waves radar, inertial navigation and odometry. The detection signals of these individual navigation systems are combined in a sensor fusion system consisting of Kalman filters and evaluated in order to obtain a reliable and precise detection signal, because each individual sensor alone would be too unreliable or too inaccurate for a fully automatic driving mode.

In DE 103 36 084 A1 a local position measuring system is described which has a base station located on a mobile object, the position of which is to be determined, a plurality of transponders being distributed around the locality.

This system is also known as "Local Positioning Radar," but must not be confused with a navigation radar having a rotating antenna on the vehicle.

These known processes for a fully automatic vehicle steering for straddle carriers have some disadvantages.

Solutions as that according to the FROG technology have the disadvantage that considerable time and efforts are required for the installation of the magnets in the ground. Because the FROG antennas at the bottom of the vehicle cannot be wider than the two traveling gears on each vehicle side, i.e. about 70 cm, a very high density of the transponders is required for the case where the odometry drifts off so that at least one transponder or magnet is detected on these 2×70 cm in order to allow a recalibration. Thus, thousands of holes must be drilled into all roadways of the terminal in order to install the magnets in the ground. Besides these substantial efforts the handling of goods is obstructed during the installation.

Solutions with a combination of DGPS with radar have the disadvantage that the mechanics of the dwarf waves navigation radar mounted on the vehicle are expensive and susceptible to faults and the required expenses in electronics in such a radar device are in economic aspects hardly justifiable.

Both solutions have the further disadvantage that the vehicles do not orient themselves at the container stack itself when traveling over a container stack but at external marks, like satellites in the case of DGPS, reflectors in the case of rotating radar, magnets in the case of FROG. By these mechanisms, the vehicle is guided along a merely theoretical path, stored in the electronic control, on which the container stack should be positioned theoretically. When the containers are in reality not exactly placed on this theoretic path, grazing, collisions, damages and thus working interruptions may occur.

SUMMARY OF THE INVENTION

It is therefore the object of the present invention to overcome the disadvantages of the known state of the art and to provide a fully automatic driverless straddle carrier with fully automatic steering, the absolute navigation sensor technology of which requires a substantially lower expense than hitherto existing solutions and which during traveling over the container stack orients itself directly at the container stack itself.

These and other objects are achieved by a fully automotive driverless straddle carrier according to the invention. One of the absolute sensor systems for the vehicle detection consists of a local radio detection system a.k.a. "Local Positioning Radar," which is arranged on the vehicle as a mobile radio base station. A plurality of radio transponders are stationarily positioned in the traveling area of the working site, and an automatic switching device is provided for switching the steering from the automatic steering by navigation to an automatic steering by laser scanners and vice versa, when the vehicle reaches, travels over or leaves a container stack. Further advantageous embodiments of the invention are discussed below.

According to the invention, an automatic driverless straddle carrier for transporting and stacking freight containers is provided, which is equipped with several different sensor systems for the vehicle detection and navigation, the signals of which being evaluated and monitored in an electronic sensor fusion system, and the current coordinates of the location determined thereby then being transmitted to a system of electric controls for automatically steering, driving and positioning the vehicle, so that the vehicle is guided, driven and positioned on preset paths stored in an electronic path control, the laser scanner serving the purpose of automatically guiding the vehicles over container stacks.

According to the invention, one of the absolute sensor systems for the vehicle detection consists of a local radio detection system, a mobile radio base station being arranged on the vehicle and a plurality of radio transponders being stationarily positioned in the traveling area of the working site. It is advantageous to arrange the radio transponders in an elevated position on the ground. Furthermore, an automatic switching device is provided, which changes the steering from an automatic steering by navigation to an automatic steering via the laser scanner when the vehicle travels over or is shortly in front of a container stack.

The straddle carrier according to the invention may be provided with a navigation system, which is arranged in addition to the local radio detection and positioning system. For this purpose, a mobile DGPS-receiver for the satellite based differential global positioning system may be arranged at the straddle carrier. The satellite based global positioning system is a Differential Global Positioning System (DGPS) with differential error compensation of the mobile DGPS-receivers by a stationing base station.

The straddle carrier further includes an electronic path control. Furthermore, laser scanners, preferably at least two laser scanners, for an automatic steering are provided. The laser scanners supply raw data concerning their surroundings and transmit them to the laser control electronics. As soon as the straddle carrier is close enough to a container or a container wall, the laser control electronics supply a switching signal to the switching device for the reference value of the steering angle so that the switching device supplies a signal to the steering computer which in its turn switches over to automatic steering by laser scanner or, for the case that the straddle carrier removes from a container or a container wall, to the automatic steering by navigation and path control. The right and the left laser control electronics exchange plausibility signals for the purpose of detecting a container. Furthermore, the laser control electronics pass the reference value for the steering angle on to the switching device and from there to the steering computer. The laser control electronics also set the speed limit for the minimum evaluation, which is passed on to the traveling gear control, presetting the reference values for the rotational speed for the driving motors. Preferably, frequency converters are connected upstream of the driving motors.

Local radio detection systems have been disclosed in numerous documents and there is therefore no reason to describe them in detail. The use of such radio detection systems for vehicles is known, in particular, radio detection systems used for straddle carriers are known, in order to be able to track the containers during the transportation, a so-called container tracking. In the present case, this radio detection system substitutes the DGPS, which in some cases, e.g. due to obstructions in the visual contact by cranes, ships, high buildings or the like, works in an unreliable or inaccurate manner. A straddle carrier, which is also automatically steered and driven via such a local radio detection system, is not known.

DGPS-systems have been described in many documents and they are thus not described in detail. The data from the radio detection system and, as the case may be, the DGPS-navigation system are passed on to a sensor fusion system as actual values of the vehicle position. The sensor fusion system provides for that signals with measuring errors, and unreliable signals from the different sensors are evaluated by specific software programs, e.g. Kalman filters, and the most probable measuring value for the vehicle position resulting therefrom is calculated. In a simple system for sensor fusion, the signals are examined only regarding their plausibility and the relative sensors are recalibrated with the signals of the absolute sensors. Rotational speed sensors at the wheels of the vehicle send distance measurement data to the sensor fusion, which sends current actual values to the path control.

Also the electronic path control is known from robot technology and there is no need to describe it in detail herein. The paths on which the vehicle should travel are stored therein in the form of path segments or path points. The path segments may be straight pieces, circular arcs or curves and are limited by a starting and a final point, the associated local coordinates of which are stored. The path control compares always the current position of the vehicle with its preset position on the path curve and calculates therefrom a reference value for the steering angle, which is supplied to the steering computer, and a reference value for the speed, which is supplied to the traveling gear control. The path control passes the calculated reference value for the steering angle via a switching device on to the steering computer.

The automatic steering via laser scanners is carried out in that at least one laser scanner measures the distance to a container wall from different angles during traveling over the container stack and passes the measured angles on to an electronic control, which calculates a reference value for the steering angle for the electronically controlled steering of the vehicle. The laser scanner may be a two-dimensional laser scanner. Furthermore it may be arranged in the front of the vehicle's traveling gear. Of course, a laser scanner may also be arranged at the rear of the vehicle's traveling gear for reversing. Furthermore, the laser scanner of the two-dimensional laser scanner may be arranged in the buffer. Commercially available robust two-dimensional laser scanners are suited as laser scanners. The laser steering is not manually switched on by the driver but by an automatic switch as soon as the laser scanners have detected a container. The detection of a container and the discrimination from another general obstacle is made in that in each case the left and the right laser scanner measure the current distance between the traveling gear of the straddle carrier and the left or the right, respectively, wall of the container. With the two measured values, the electronic control is able to calculate the width of the obstacle. If this calculated width corresponds to the internationally standardized container width, the vehicle may travel on over the container. If this calculated width does not so correspond, the vehicle will be stopped.

The switching device may be an electronic control or a software program, which is integrated in the software package of the sensor fusion. Such software programs for switching signals may be programmed in a relative simple manner, which is well known to one skilled in the art. Therefore, they are not described in detail.

BRIEF DESCRIPTION OF THE DRAWINGS

Other objects and features of the present invention will become apparent from the following detailed description considered in connection with the accompanying drawings. It should be understood, however, that the drawings are designed for the purpose of illustration only and not as a definition of the limits of the invention.

In the drawings, wherein similar reference characters denote similar elements throughout the several views:

FIG. 6 is a representation of the principles of the laser control.

DETAILED DESCRIPTION OF PREFERRED EMBODIMENTS

Figures 1, 2:
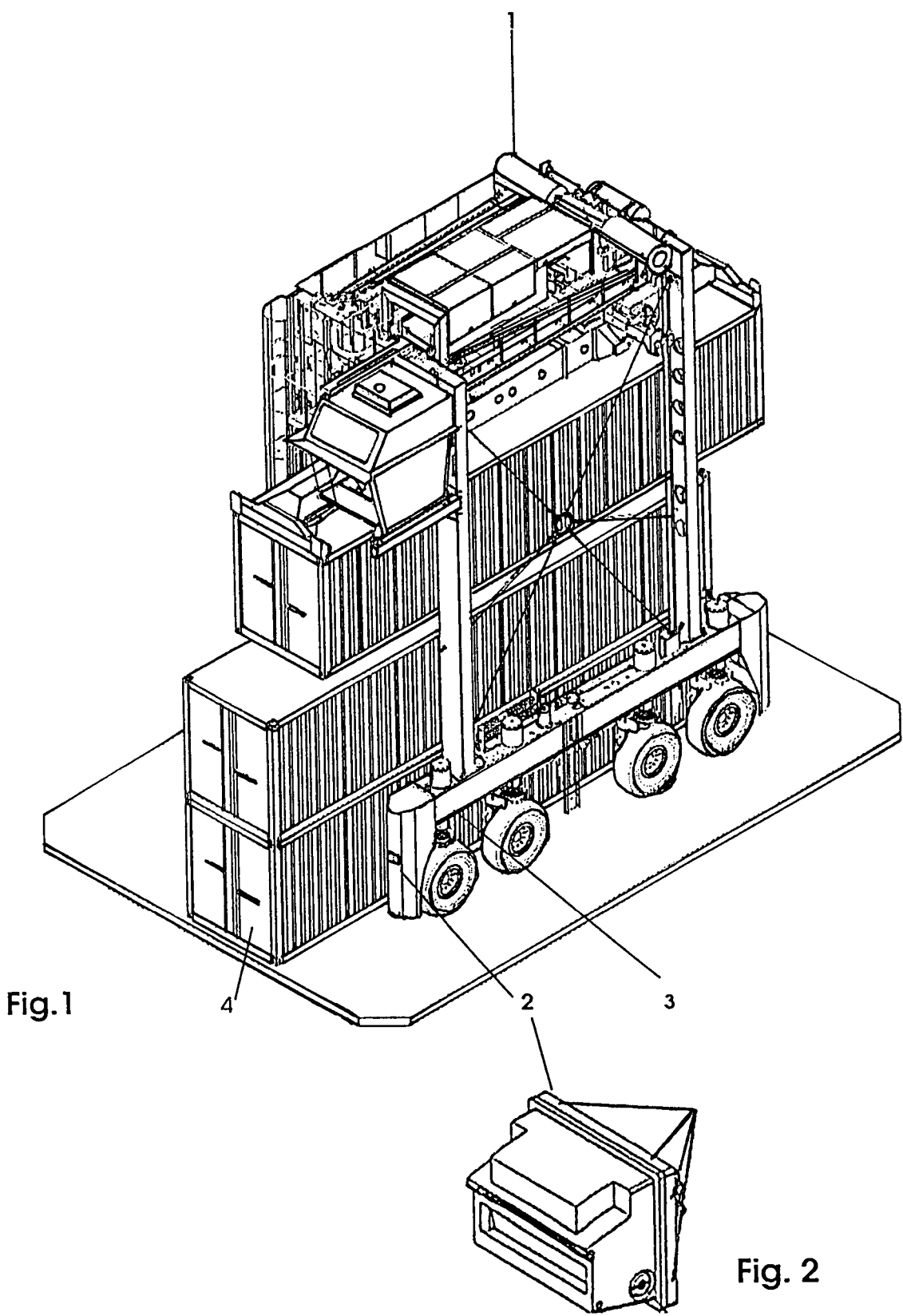
FIG. 1 shows a straddle carrier, which is traveling over a container stack, a laser scanner being attached to the left front of the traveling gear in a manner protected by the buffer.
FIG. 2 shows the laser scanner of FIG. 1.

Referring now in detail to the drawings and in particular, FIG. 1 shows a transport vehicle or straddle carrier 1 above a container stack 4, the laser scanner 2 being arranged at the front of the vehicle's traveling gear (with wheels) 3 in a buffer. Straddle carrier 1 travels over a stack of containers 4.

Laser scanner 2 is shown in FIG. 2 in detail. It represents a two-dimensional laser scanner.

Figure 3:
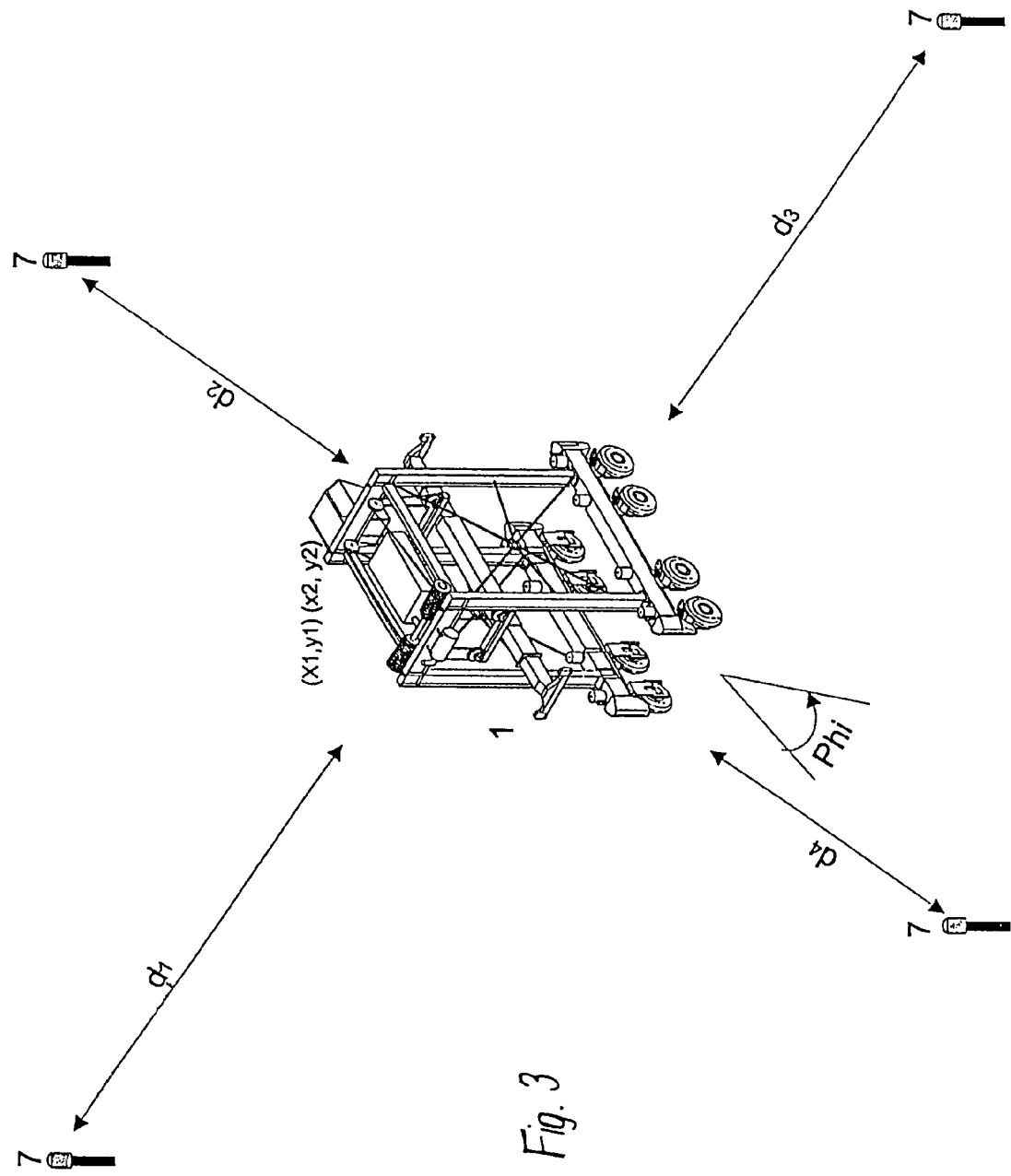
FIG. 3 shows the radio detection system of the straddle carrier with radio transponders.

FIG. 3 shows a straddle carrier 1, on which a base radio station is arranged. Radio transponders 7 are arranged on posts in the surroundings of transport vehicle 1, which are in communication with the base radio station by means of signals (d1, d2, d3, d4).

Figure 4:
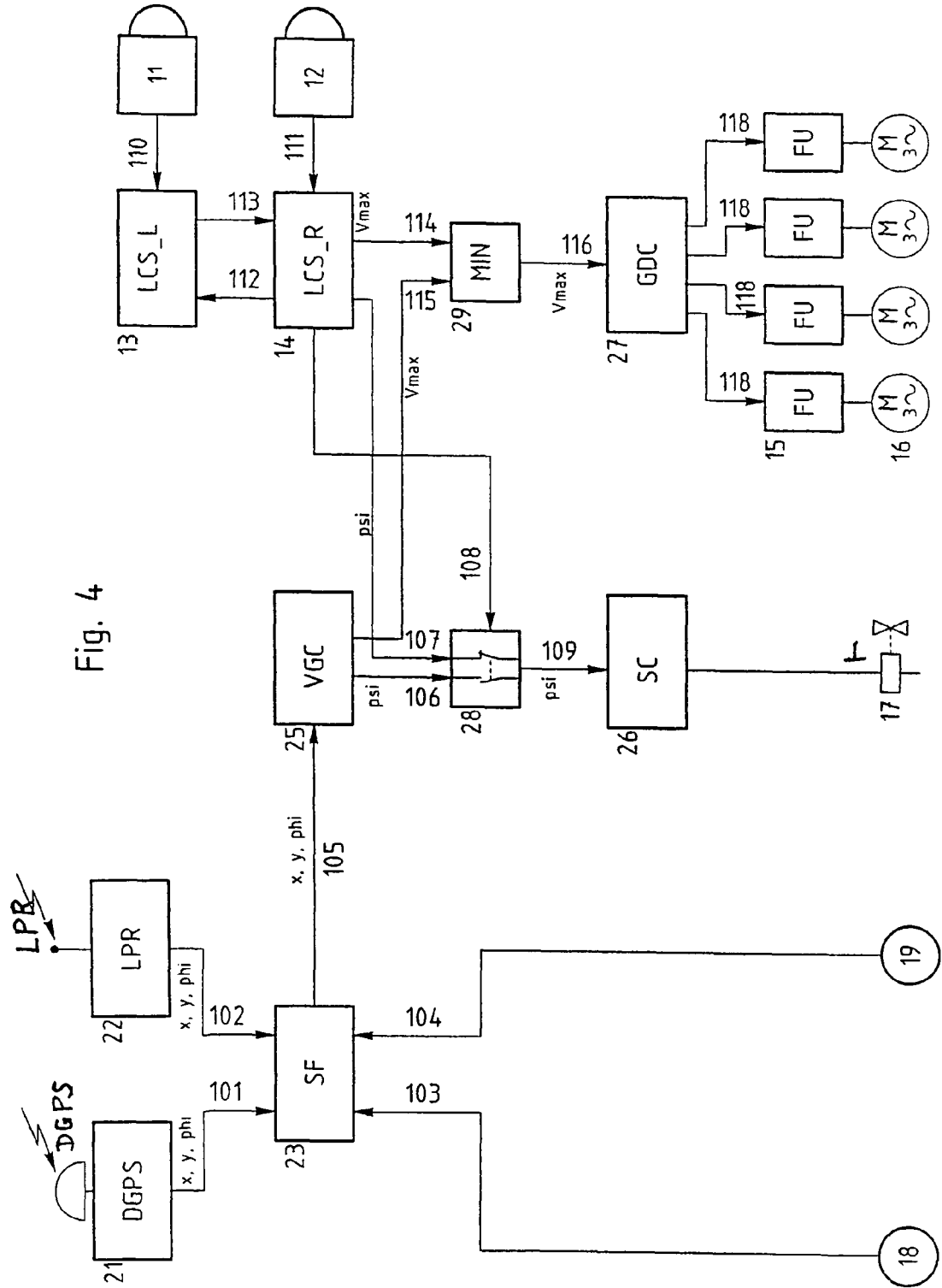
FIG. 4 is a block diagram and signal flow chart depicting a diagrammatic representation of the software functions of the navigation and vehicle guide system for an automatic driverless straddle carrier.

FIG. 4 shows in the form of a block diagram and signal flowchart a general plan of the software function of the navigation and vehicle guide system for a fully automatic driverless straddle carrier. The position of the vehicle (actual value) of the DGPS is designated as 101. The position of the vehicle (actual value) of the radio detection system is designated as 102. The measured distance values of the left and right rotary encoders of the wheel (odometry signal) are respectively designated 103, 104. The receiver or base station on the vehicle of the local radio detection system (Local Positioning Radar (LPR)) 22 of the vehicle and the receiver 21 for the satellite based global positioning system are arranged on the straddle carrier. The receivers 21, 22 receive the signals of the DGPS and the LPR (local radio detection system) and pass the actual value of the vehicle position 101, 102 from the radio detection system and the DGPS on to a sensor fusion (SF) 23. Rotary encoders 18, 19 arranged at the left and at the right vehicle wheel, respectively, send a signal for distance measuring 103, 104 of the rotary encoder in question (odometry signal) to the sensor fusion 23, from which an evaluated current actual value 105 for the vehicle position measured by sensor fusion is passed on to the electronic path control 25. Path control 25 is a Vehicle Guide Controller (VGC) or vehicle guide system. On the left side and on the right side of the vehicle there are arranged laser scanners 11, 12, which send in each case raw data 110, 111 of the laser scanner of the measured surroundings to the left and to the right of the straddle carrier to the laser control electronics 13, 14 and exchange plausibility signals 112, 113 for the container detection. The electronic laser control on the left side is designated LCS_L (Laser Control System Left). The electronic laser control on the right side is designated LCS_R (Laser Control System Right).

The laser control electronics 14 on one side, in the present case on the right side, evaluate the reference value 107 for the steering angle of the laser control and pass the switching signal 108 for the setting value from the laser steering, as the case may be, on to the switching device 28 for the reference value of the steering angle of the laser control when the vehicle is close enough to a container stack. Furthermore, the laser control may supply a signal for the speed limit 114 from the laser steering. A signal for the speed limit 115 may also be supplied by the path control 25. A resulting signal for the speed limit 116 may be supplied from the electronic control for the traveling gear or Gantry Drive Controller (GDC). The traveling gear control 27 sends reference values for the rotational speed 118 to the driving motors 16 of the wheels. The switching device 28 for the reference or setting value of the steering angle is controlled on the basis of the switching signal 108 and the reference or setting values for the steering angle 106, 107, the switching device 28 sending a resulting reference or setting value 109 for the steering angle to the steering computer (SC) 26 of the electrohydraulic control of the traveling gear. Steering computer 26 is in communication with an electrical proportional valve 17 for the hydraulic steering. Frequency converters (FU) 15 may be arranged at the driving motors 16 for the wheels to receive a reference or setting value for the rotational speed 118 from the control of the traveling gear 27 on the basis of a minimum evaluation (MIN) 29, into which the speed limits 114, 115 of the path control 25 and the laser control 13, 14 are integrated. Via this navigation and vehicle guide system, it is possible to steer and drive a straddle carrier automatically and to switch over to the automatic steering via the laser scanners 11, 12 when approaching a container stack.

The steering computer 26 for the vehicle is controlled by the reference value for the steering angle 106 of the path control 25 and the reference value for the steering angle 107 of the laser control 13, 14 via the switching device 28 for the reference value for the steering angle 109, the steering computer 26 acting on the electrical proportional valve 17 for the hydraulic steering.

Figure 5:
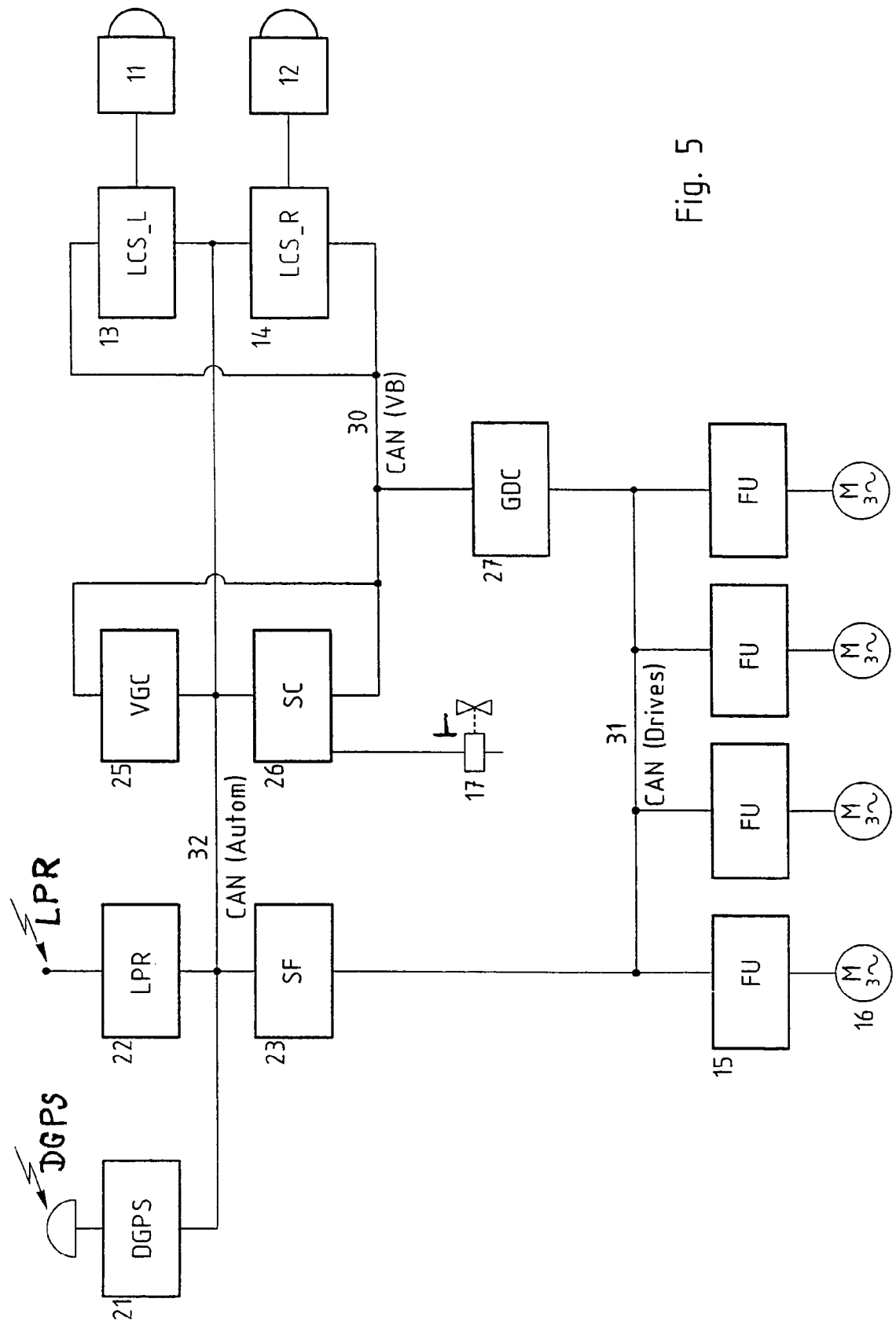
FIG. 5 shows the hardware structure of the electronic control system of the straddle carrier according to the invention with a bus topology and all bus subscribers at three Controller Area Network (CAN) buses.

FIG. 5 shows in a principle representation the hardware structure of the electronic control system of the straddle carrier with a possible bus topology. Straddle carrier 1 includes receiver 21 for the signals of a satellite based global positioning system and receivers 22 for a local radio detection system. On the right and left side, laser scanners 11, 12 are arranged. Laser scanners 11, 12 detect the surroundings and send their signals to the left and the right laser scanner electronics 13, 14 and check themselves against one another. The arrangement of the three following CAN buses is shown in the figure:

The central CAN bus (VB) 30 of the vehicle,
the CAN bus 31 of the vehicle drives and
the CAN bus 32 of the automatization and navigation.

FIG. 6 shows containers 4 arranged one behind the other, between which lanes are arranged in which the straddle carrier travels by means of its traveling gear 3, it being required to observe a distance a relative to the container wall 5. The laser scanners 11, 12 of the right and left vehicle sides measure via laser beams 6 the distance a between traveling gear 3 and the container and pass the signal of their measurements on to the laser control electronics 13, 14, which is diagrammatically shown in FIGS. 4 and 5.

The fully automatic straddle carrier with local radio detection and laser steering has the following advantages:

As compared with the known solutions with transponders/magnets buried into the ground, there is less technical effort, because the radio transponders may be mounted overground, e.g. at lamp poles and also the number of required transponders is substantially lower.

The operational obstructions on the terminal, which occur during the installation of transponders/magnets buried into the ground due to drilling works, are omitted during the installation of radio transponders at lamp poles.

As compared with the other known solution with a mobile navigation radar, with a mechanically rotating antenna and passive overground reflectors, the technical expense is likewise diminished, because the mechanics, which wear out and are susceptible to faults as well as the control and evaluation electronics for the rotating antenna are omitted.

During traveling over the container stack, the vehicle is guided precisely along the real container stack even if the containers are somewhat offset or inclined and does not travel only on a virtual electronically stored path as in the hitherto known solutions.

As a result, less precise and thus less expensive navigation systems may be used, because steering via the navigation system is carried out only outside of the container stacks where a precise steering is not required.

Accordingly, although only a few embodiments of the present invention have been shown and described, it will become apparent that many changes and modifications may be made thereunto without departing from the spirit and scope of the invention.

The invention claimed is:

1. A fully automatic driverless straddle carrier system for transporting and stacking freight containers comprising:
    (a) a vehicle having vehicle wheels, driving motors for the vehicle wheels, and a traveling gear;
    (b) a plurality of different sensor systems for vehicle detection and navigation, said plurality of different sensor systems comprising a first sensor system for vehicle detection comprising a local radio detection system arranged on the vehicle and functioning as a mobile radio base station;
    (c) an electronic sensor fusion system evaluating and monitoring signals of sensors of said sensor systems to determine current coordinates of a location of the vehicle;
    (d) an electronic path control storing a plurality of preset paths for the vehicle;
    (e) a system of electronic controls for automatically steering, driving and positioning the vehicle on the preset paths stored in the electronic path control based on the current coordinates transmitted from the electronic sensor fusion system, said system comprising a steering system for the vehicle and a traveling gear control for control of traveling gear;
    (f) a plurality of laser scanners arranged at the vehicle for automatically guiding the vehicle over a container stack;
    (g) a plurality of radio transponders stationarily positioned in a traveling area of a working site; and
    (h) an automatic switching device for switching the steering system from automatic steering by navigation to automatic steering by the laser scanners and vice versa when the vehicle reaches, travels over or leaves the container stack.

2. The straddle carrier system as claimed in claim 1, wherein said plurality of different sensor systems comprises a second sensor system for vehicle navigation comprising a navigation system receiver, wherein the local radio detection system and the navigation system receiver send actual values for vehicle position to the sensor fusion system, and wherein rotary encoders are arranged at the vehicle wheels, measured distance values being sent from the rotary encoders to the sensor fusion system so that a current actual value for the vehicle position of the vehicle is passed on to the path control.

3. The straddle carrier system as claimed in claim 1, wherein the system of electronic controls comprises laser control electronics, wherein the switching device receives a reference value for the steering angle from the path control and the laser control electronics and passes the reference value for the steering angle on to a steering computer and an electrical proportional valve for hydraulic steering.

4. The straddle carrier system as claimed in claim 3, wherein the switching device receives from the laser control electronics a switching signal for the reference value for the steering angle.

5. The straddle carrier system as claimed in claim 3, further comprising a plurality of frequency converters arranged at the driving motors for the vehicle wheels, wherein the path control and the laser control electronics supply signals for speed limits, said frequency converters receiving a reference value for the rotational speed from the traveling gear control on the basis of a minimum evaluation, the signals for the speed limits supplied by the path control and the laser control electronics being integrated into the reference value.

6. The straddle carrier system as claimed in claim 1, wherein the radio transponders are arranged in an elevated position over the ground.

7. The straddle carrier system as claimed in claim 1, wherein the automatic switching device comprises an electronic switch or a software program for an electronic control.

8. The straddle carrier system as claimed in claim 1, wherein at least one laser scanner of the plurality of laser scanners is a two-dimensional laser scanner.

* * * * *